(12) United States Patent
Kawada et al.

(10) Patent No.: US 7,012,936 B2
(45) Date of Patent: Mar. 14, 2006

(54) INITIALIZING METHOD AND DATA TRANSMITTER

(75) Inventors: Hirotsugu Kawada, Sakai (JP); Yuji Mizuguchi, Hirakata (JP); Takahisa Sakai, Amagasaki (JP); Noboru Katta, Itami (JP); Toshihiko Kurosaki, Kobe (JP); Nobuhiko Yasui, Moriguchi (JP); Yutaka Takahira, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 465 days.

(21) Appl. No.: 10/398,452

(22) PCT Filed: Oct. 5, 2001

(86) PCT No.: PCT/JP01/08789

§ 371 (c)(1),
(2), (4) Date: Apr. 4, 2003

(87) PCT Pub. No.: WO02/30078

PCT Pub. Date: Apr. 11, 2002

(65) Prior Publication Data

US 2004/0042542 A1 Mar. 4, 2004

(30) Foreign Application Priority Data

Oct. 5, 2000 (JP) .............................. 2000-305821

(51) Int. Cl.
*H04J 3/06* (2006.01)

(52) U.S. Cl. ....................... 370/503; 370/509; 370/514; 370/515; 375/368

(58) Field of Classification Search ................ 370/503, 370/515, 509, 510, 511, 512, 513, 514; 375/354, 375/362–368
See application file for complete search history.

(56) References Cited

U.S. PATENT DOCUMENTS 4,028,667 A 6/1977 Breslau et al.

(Continued)

FOREIGN PATENT DOCUMENTS

EP 0 450 879 10/1991

(Continued)

OTHER PUBLICATIONS

Oscar Agazzi and Alberto A. Adan, "An Analog Front End for Full-Duplex Digital Transceivers Working on Twisted Pairs", IEEE Journal of Solid-State Circuits, vol. 24, No. 2, Apr. 1989, pp. 229-240.

(Continued)

*Primary Examiner*—Ajit Patel
(74) *Attorney, Agent, or Firm*—Wenderoth, Lind & Ponack, L.L.P.

(57) ABSTRACT

A first initialization pattern signal is a signal in which a maximum signal level and a minimum signal level appear alternately, and a second initialization pattern signal is a signal in which all signal levels appear in a predetermined arrangement. In a ring-shaped network including plural stages of data transmission apparatuses (100), a transmission unit (110) of each data transmission apparatus outputs the first initialization pattern signal successively to a next-stage data transmission apparatus at turn-on of power or immediately after reset, and a reception unit (120) establishes clock synchronization on the basis of the first initialization pattern signal received. When synchronization is established in all of the data transmission apparatuses, the transmission unit (110) outputs the second initialization pattern signal successively to the next-stage data transmission apparatus, and the reception unit (120) sets evaluation levels for the respective signal levels on the basis of the received second initialization pattern signal, and transmission/reception of data is started when evaluation levels are set in all of the data transmission apparatuses.

7 Claims, 7 Drawing Sheets

U.S. PATENT DOCUMENTS

| | | | |
|---|---|---|---|
| 4,083,005 A | 4/1978 | Looschen | |
| 4,547,879 A | 10/1985 | Hamelin et al. | |
| 4,769,839 A | 9/1988 | Preineder et al. | |
| 4,924,492 A | 5/1990 | Gitlin et al. | |
| 4,982,185 A | 1/1991 | Holmberg et al. | |
| 5,052,021 A | 9/1991 | Goto et al. | |
| 5,206,857 A | 4/1993 | Farleigh | |
| 5,297,163 A | 3/1994 | Pfeiffer | |
| 5,301,185 A | 4/1994 | Cherry | |
| 5,303,265 A | 4/1994 | McLean | |
| 5,450,451 A * | 9/1995 | Isozaki | 375/273 |
| 5,739,842 A * | 4/1998 | Murata | 347/252 |
| 5,812,594 A | 9/1998 | Rakib | |
| 5,850,441 A | 12/1998 | Townsend et al. | |
| 5,898,734 A | 4/1999 | Nakamura et al. | |
| 5,942,994 A | 8/1999 | Lewiner et al. | |
| 6,157,680 A | 12/2000 | Betts et al. | |
| 6,421,323 B1 | 7/2002 | Nelson et al. | |
| 6,545,532 B1 | 4/2003 | Maalej et al. | |
| 2002/0106037 A1 | 8/2002 | Gara | |

FOREIGN PATENT DOCUMENTS

| | | |
|---|---|---|
| EP | 0 490 504 | 6/1992 |
| EP | 0 511 786 | 11/1992 |
| JP | 55-38633 | 3/1980 |
| JP | 63-110840 | 5/1988 |
| JP | 3-195144 | 8/1991 |
| JP | 4-352535 | 12/1992 |
| JP | 5-14419 | 1/1993 |
| JP | 6-29987 | 2/1994 |
| JP | 7-050683 | 2/1995 |
| JP | 8-163162 | 6/1996 |
| JP | 9-205466 | 8/1997 |
| JP | 11-509376 | 8/1999 |
| JP | 2000-49764 | 2/2000 |

OTHER PUBLICATIONS

Clayton: "Introduction to Electromagnetic Compatibility" 1992, John Wiley & Sons, New York, US XP002279634, chapters 8 and 13.

* cited by examiner

| data | mapping value |
|------|---------------|
| 111  | +7            |
| 110  | +5            |
| 101  | +3            |
| 100  | +1            |
| 011  | -1            |
| 010  | -3            |
| 001  | -5            |
| 000  | -7            |

# INITIALIZING METHOD AND DATA TRANSMITTER

TECHNICAL FIELD

The present invention relates to an initialization method and a data transmission apparatus in a ring-shaped network and, more particularly, to those for generating an initialization pattern signal for establishing synchronization and an initialization pattern signal for setting evaluation levels, and performing establishment of synchronization and setting of evaluation levels on the basis of these initialization pattern signals.

BACKGROUND ART

As a conventional data transmission method, there is a method for transmitting data while converting data symbols into signal levels of an electric signal or an optical signal. During such data transmission, when the signal being transmitted continuously takes a constant signal level or when it repeatedly takes a specific pattern of signal levels, a data reception apparatus cannot detect the magnitudes of original signal levels, and therefore, it cannot perform accurate data reception. As a method for avoiding this problem there is a scrambling method if which data symbols to be transmitted are evenly assigned to all signal levels by adding random numbers to digital data to be transmitted.

FIG. 8 is a diagram illustrating the construction of a data receiver for CATV (CABLE TELEVISION). As shown in FIG. 8, the data receiver for CATV is provided with a tuner 801, a down converter 802, an A/D converter 803, a detector 804, a digital filter 805, an evaluation unit 806, a descrambler 807, a clock reproduction unit 808, and a gain detector 809.

Since CATV data are scrambled, all signal levels are almost evenly included in received data symbols. Usually, quadrature amplitude modulation such as 16 QAM or 64 QAM is employed as a CATV transmission method, and a coaxial cable is employed as a transmission path.

Next, the operation of the CATV data receiver so constructed will be described.

A QAM signal received through a coaxial cable is frequency-converted through the tuner 801 and the down converter 802, and one channel of QAM signal is input to the A/D converter 803. This one channel of QAM signal is converted into a digital signal by the A/D converter 803, and an I-axis signal and a Q-axis signal are separated and demodulated by the detector 804. After removal of noises through the digital filter 805, data symbols are decoded by the evaluation unit 806, and descrambled by the descrambler 807 thereby obtaining data. Further, the clock reproduction unit 808 establishes synchronization by detecting clock shift in a transmission unit from the I-axis signal and the Q-axis signal.

Since the data are scrambled, all signal levels are almost evenly included in the received signal. The gain detector 809 detects the received signal level, and performs gain control so that the signal level is correctly decoded by the evaluation unit 806. That is, the gain detector 809 feeds the received signal level back to the down converter 802 so as to correlate the signal level to a stored threshold value, thereby performing gain control. Further, the down converter 802 performs gain control for the tuner 801 as desired.

However, when performing scrambling or descrambling, a data frame for adjusting data timing is needed, and therefore, scrambling cannot be performed on data in a format having no data frame. Moreover, even when scrambling can be carried out, if a data pattern to be transmitted matches a random number sequence used for scrambling, the same signal level continues undesirably.

Furthermore, since, in the conventional data transmission method, it is necessary to receive all signal levels to perform gain control, the data should be scrambled to be averaged. However, when a pattern of signal in which only a specific signal level appears continues, gain control becomes impossible, and accurate evaluation of signal levels cannot be carried out.

Moreover, also in a network in which plural stages of data transmission/reception apparatuses each having a transmission unit for transmitting data and a reception unit for receiving data are connected in a ring shape, the reception unit of each data transmission/reception apparatus has the same problem as in the above-described data receiver.

The present invention is made to solve the above-described problems and has for its object to provide an initialization method and a data transmission apparatus, which realize accurate data transmission independent of signal levels and patterns, without scrambling data to be transmitted, in multi-valued transmission.

DISCLOSURE OF THE INVENTION

In order to solve the above-described problems, according to an embodiment of the present invention, there is provided an initialization method to be used in a network in which plural stages of data transmission apparatuses each performing data transmission while assigning one or more bits of data as one data symbol to a signal level, are connected in a ring shape, wherein one of the data transmission apparatuses is a master data transmission apparatus, while the other data transmission apparatuses are slave data transmission apparatuses; at turn-on of power or immediately after reset, the master data transmission apparatus outputs a first initialization pattern signal to a slave data transmission apparatus in the next stage; the next-stage slave data transmission apparatus establishes clock synchronization on receipt of the first initialization pattern signal; when clock synchronization is established, the next-stage slave data transmission apparatus outputs the first initialization pattern signal to a slave data transmission apparatus in the next stage; when synchronization is established in all of the slave data transmission apparatuses and the master data transmission apparatus which are connected in the network, the master data transmission apparatus outputs a second initialization pattern signal to the next-stage slave data transmission apparatus; the next-stage slave data transmission apparatus receives the second initialization pattern signal, sets an evaluation level for each signal level, and outputs the second initialization pattern to a data transmission apparatus in the next stage; and transmission/reception of data is started after evaluation levels of data are set in all of the slave data transmission apparatuses and the master data transmission apparatus which are connected in the network.

Further, according to another embodiment of the present invention in an initialization method discussed above, the first initialization pattern signal is a signal in which a maximum signal level and a minimum signal level appear alternately; and the second initialization pattern signal is a signal in which all signal levels appear in a predetermined arrangement.

Further, according to another embodiment of the present invention, in an initialization method discussed above, the first initialization pattern signal is a signal in which a signal for discriminating between the first initialization pattern signal and the second initialization pattern signal appears at the end.

Further, according to another embodiment of the present invention, in an initialization method discussed above, the second initialization pattern signal is a signal in which a signal for discriminating between the first initialization pattern signal and the second initialization pattern signal appears at the beginning.

Further, according to another embodiment of the present invention, there is provided a data transmission apparatus which is connected in a ring-shaped network, and performs data transmission while assigning one or more bits of data as one data symbol to a signal level. The apparatus comprises: a first initialization pattern output unit for outputting a first initialization pattern signal for establishing clock synchronization to a data transmission apparatus connected in the next stage; a second initialization pattern output unit for outputting a second initialization pattern signal for setting an evaluation level by which the signal level is subjected to threshold evaluation, to the data transmission apparatus connected in the next stage; and a synchronization establishment unit for receiving the first initialization pattern signal transmitted from a data transmission apparatus connected in the previous stage, and performing clock reproduction to establish synchronization; wherein transmission/reception of data is started after synchronization is established on receipt of the first initialization pattern signal, and evaluation levels of data are set on receipt of the second initialization pattern signal.

Further, according to another embodiment of the present invention, a data transmission apparatus discussed above is a master data transmission apparatus in which the first initialization pattern output unit outputs the first initialization pattern signal at turn-on of power or immediately after reset, and the second initialization pattern output unit outputs the second initialization pattern signal when synchronization is established in all of the data transmission apparatuses.

Further, according to another embodiment of the present invention, a data transmission apparatus discussed above is a slave data transmission apparatus in which the first initialization pattern output unit outputs the first initialization pattern signal when synchronization is established, and the second initialization pattern output unit outputs the second initialization pattern signal when the beginning of the second initialization pattern signal is received.

As described above, according to the embodiment of the present invention, wherein there is provided an initialization method to be used in a network in which plural stages of data transmission apparatuses each performing data transmission while assigning one or more bits of data as one data symbol to a signal level, are connected in a ring shape, wherein one of the data transmission apparatuses is a master data transmission apparatus, while the other data transmission apparatuses are slave data transmission apparatuses; at turn-on of power or immediately after reset, the master data transmission apparatus outputs a first initialization pattern signal to a slave data transmission apparatus in the next stage; the next-stage slave data transmission apparatus establishes clock synchronization on receipt of the first initialization pattern signal; when clock synchronization is established, the next-stage slave data transmission apparatus outputs the first initialization pattern signal to a slave data transmission apparatus in the next stage; when synchronization is established in all of the slave data transmission apparatuses and the master data transmission apparatus which are connected in the network, the master data transmission apparatus outputs a second initialization pattern signal to the next-stage slave data transmission apparatus; the next-stage slave data transmission apparatus receives the second initialization pattern signal, sets an evaluation level for each signal level, and outputs the second initialization pattern to a data transmission apparatus in the next stage; and transmission/reception of data is started after evaluation levels of data are set in all of the slave data transmission apparatuses and the master data transmission apparatus which are connected in the network, synchronization of the respective data transmission apparatuses can be established, and evaluation levels of data symbols can be set. Further, since evaluation levels are set on the basis of the voltage values of the respective signal levels included in the second initialization pattern signal, evaluation levels can be set in accordance with the transmission path, whereby accurate data reception can be carried out without being affected by the pattern of data symbols to be transmitted or the values of the received signal levels. Moreover, since each data transmission apparatus can transmit the second initialization pattern signal to the next-stage data transmission apparatus upon receipt of the beginning of the second initialization pattern, setting of evaluation levels and initialization of the ring-shaped network can be carried out more speedily.

Further, according to the embodiment of the present invention, wherein in an initialization method discussed above, the first initialization pattern signal is a signal in which a maximum signal level and a minimum signal level appear alternately; and the second initialization pattern signal is a signal in which all signal levels appear in a predetermined arrangement. Therefore, evaluation levels of data symbols can be set after synchronization is established by clock reproduction. Further, all of the signal levels can be obtained without scrambling the second initialization pattern signal.

Further, according to the embodiment of the present invention, wherein in an initialization method discussed above, the first initialization pattern signal is a signal in which a signal for discriminating between the first initialization pattern signal and the second initialization pattern signal appears at the end, the beginning of the second initialization pattern signal can be detected, whereby the second initialization pattern signal can be transmitted to the next-stage data transmission apparatus without waiting for reception of the whole second initialization pattern signal.

Further, according to the embodiment of the present invention, wherein in an initialization method as discussed above, the second initialization pattern signal is a signal in which a signal for discriminating between the first initialization pattern signal and the second initialization pattern signal appears at the beginning, the beginning of the second initialization pattern signal can be detected, whereby the second initialization pattern signal can be transmitted to the next-stage data transmission apparatus without waiting for reception of the whole second initialization pattern signal.

Further, according to the embodiment of the present invention, wherein there is provided a data transmission apparatus which is connected in a ring-shaped network, and performs data transmission while assigning one or more bits of data as one data symbol to a signal level, and the apparatus comprises: a first initialization pattern output unit for outputting a first initialization pattern signal for establishing clock synchronization to a data transmission apparatus connected in the next stage; a second initialization pattern output unit for outputting a second initialization pattern signal for setting an evaluation level by which the signal level is subjected to threshold evaluation, to the data transmission apparatus connected in the next stage; and a synchronization establishment unit for receiving the first initialization pattern signal transmitted from a data transmission apparatus connected in the previous stage, and performing clock reproduction to establish synchronization; wherein transmission/reception of data is started after synchronization is established on receipt of the first initialization pattern signal, and evaluation levels of data are set on receipt of the second initialization pattern signal, synchronization of the respective data transmission apparatuses can be established, and evaluation levels of data symbols can be set. Further, since evaluation levels are set according to the voltage values of the respective signal levels included in the second initialization pattern signal, evaluation levels can be set in accordance with the transmission path, whereby accurate data reception can be carried out without being affected by the pattern of data symbols to be transmitted or the values of the received signal levels.

Further, according to the embodiment of the present invention, wherein a data transmission apparatus discussed above is a master data transmission apparatus in which the first initialization pattern output unit outputs the first initialization pattern signal at turn-on of power or immediately after reset, and the second initialization pattern output unit outputs the second initialization pattern signal when synchronization is established in all of the data transmission apparatuses, the ring-shaped network can be initialized.

Further, according to an embodiment of the present invention, wherein a data transmission apparatus discussed above is a slave data transmission apparatus in which the first initialization pattern output unit outputs the first initialization pattern signal when synchronization is established, and the second initialization pattern output unit outputs the second initialization pattern signal when the beginning of the second initialization pattern signal is received, the ring-shaped network can be initialized. Further, since the data transmission apparatus can transmit the second initialization pattern signal to the next-stage data transmission apparatus upon receipt of the beginning of the second initialization pattern signal, setting of evaluation levels and initialization of the ring-shaped network can be carried out more speedily.

BEST MODE TO EXECUTE THE INVENTION

Hereinafter, an embodiment of the present invention will be described with reference to the drawings. However, the embodiment described hereinafter is merely an example, and the present invention is not restricted thereto.

(Embodiment 1)

An initialization method of the present invention, and a data transmission apparatus will be described as a first embodiment with reference to the drawings.

Figure 1:
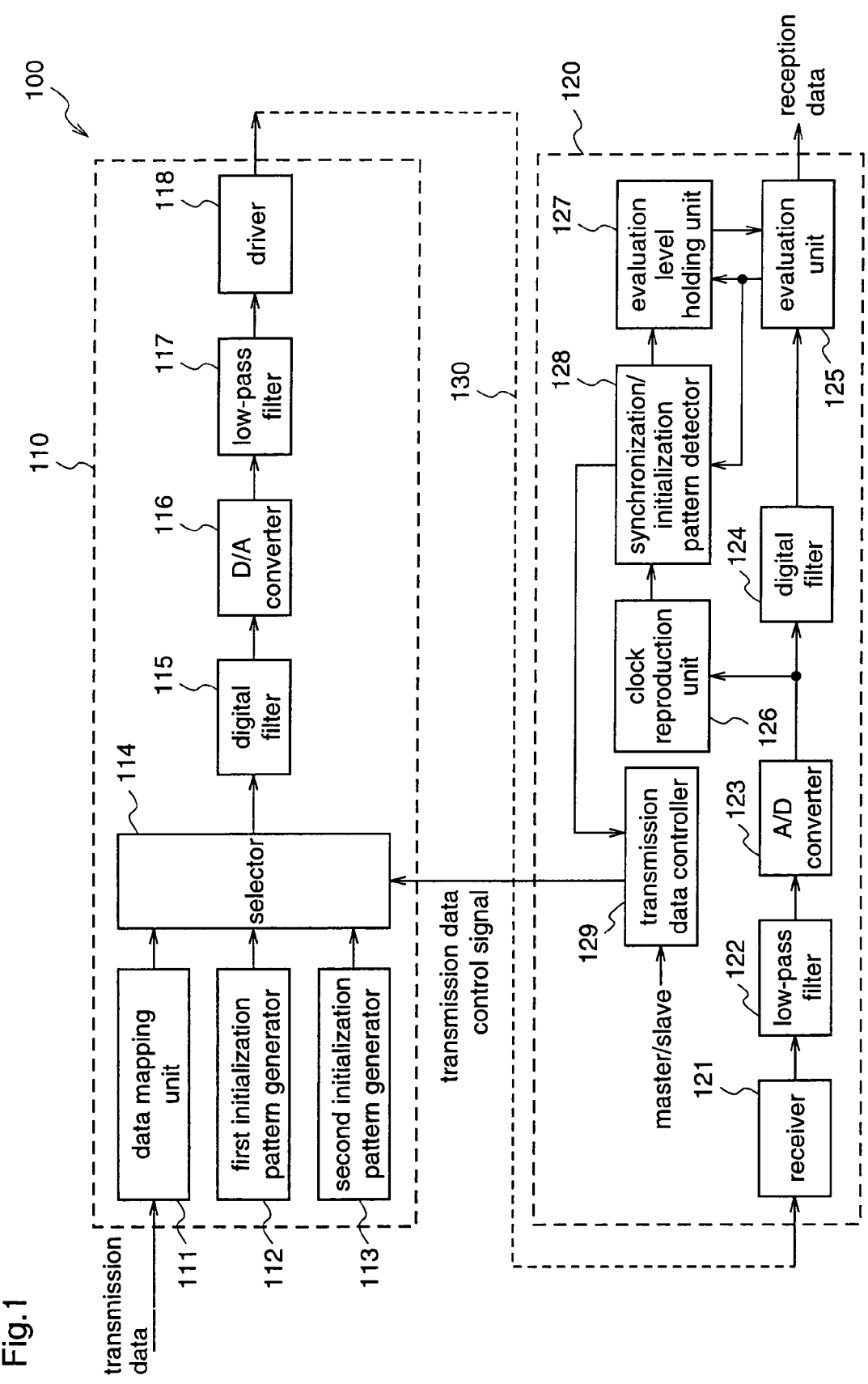
FIG. 1 is a block diagram illustrating the construction of a data transmission apparatus according to a first embodiment of the present invention.

FIG. 1 is a block diagram illustrating the construction of a data transmission apparatus according to the first embodiment.

As shown in FIG. 1, a data transmission apparatus 100 according to the first embodiment is provided with a transmission unit for outputting data, a reception unit 120 for receiving the data outputted from the transmission unit 110, and a transmission path 130 for transmitting the data outputted from the transmission unit 110.

The transmission unit 110 is provided with a data mapping unit 111 for mapping a digital signal to be transmitted to eight signal levels at every symbol timing; a first initialization pattern generator 112 for generating a first initialization pattern signal; a second initialization pattern generator 113 for generating a second initialization pattern signal; a selector 114 for selecting a signal to be transmitted from among the signal levels to which the digital signal is mapped, the first initialization pattern signal, and the second initialization pattern signal; a digital filter 115 which allows a band of frequency components corresponding to half of the symbol rate to pass; a D/A converter 116 for converting digital data into an analog signal; a low-pass filter 117 for removing noises outside the signal band of the signal to be transmitted; and a driver 118 for amplifying the signal intensity, and outputting the signal to the transmission path 130.

On the other hand, the reception unit 120 is provided with a receiver 121 for receiving the signal; a low-pass filter 122 for removing noises outside the signal band; an A/D converter 123 for converting the signal into digital signal; a digital filter 124 which allows a band of frequency components corresponding to half of the symbol rate to pass; a clock reproduction unit 126 for establishing synchronization; an evaluation level holding unit 127 for setting evaluation levels corresponding to the respective signal levels, and holding them; an evaluation unit 125 for performing threshold evaluation on the respective signal levels on the basis of the signal level evaluation values which are stored in the evaluation level holding unit 127, and decoding the data symbols; a synchronization/initialization pattern detector 128 for detecting establishment of synchronization, and the beginning of the second initialization pattern signal; and a transmission data controller 129 for outputting a transmission data control signal which instructs transmission of a signal selected from among the signal outputted from the data mapping unit 111, the first initialization pattern signal, and the second initialization pattern signal.

Further, a coaxial cable or a twisted-pair cable is used as the transmission path 130. When the transmission path 130 is a twisted-pair cable, a differential output driver should be used as the driver 118.

Figures 2, 3:
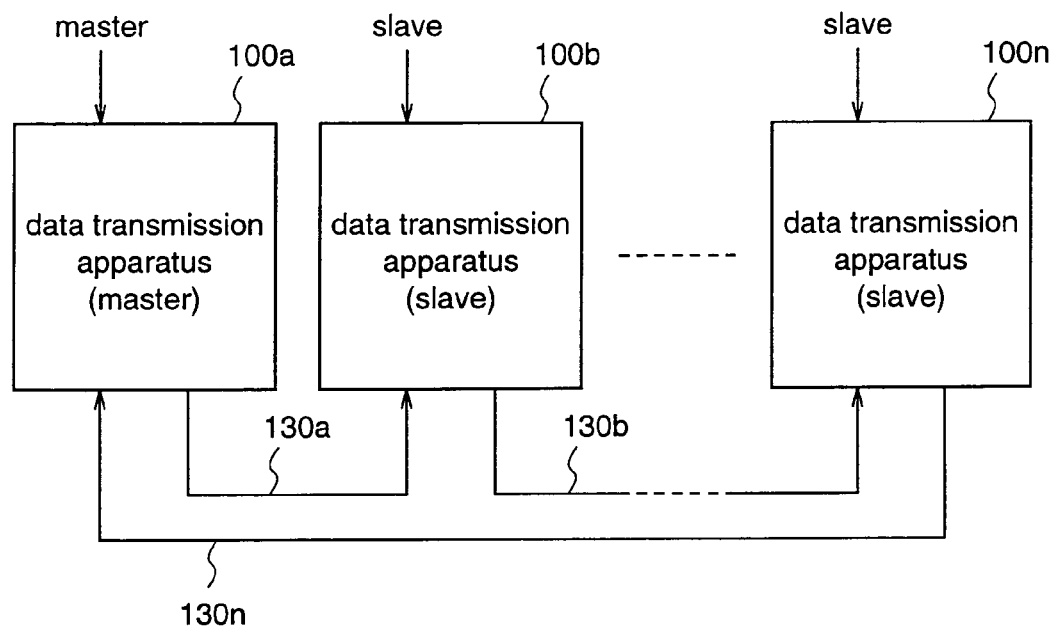
FIG. 2 is a block diagram illustrating the construction of a ring-shaped network in which the data transmission apparatus according to the first embodiment of the invention is connected.
FIG. 3 is a diagram for explaining a method for converting data symbols into signal levels according to the first embodiment of the invention.

FIG. 2 is a block diagram illustrating the construction of a ring-shaped network according to the first embodiment.

As shown in FIG. 2, the ring-shaped network according to the first embodiment is provided with n stages of data transmission apparatuses 100, and these data transmission apparatuses are connected in a ring shape such that a signal outputted from a transmission unit 110 of a previous-stage data transmission apparatus 100 is received by a reception unit 120 of a next-stage data transmission apparatus 100, and a signal outputted from a transmission unit 110 of a final-stage data transmission apparatus 100 is received by a reception unit 120 of an initial-stage data transmission apparatus 100.

All of the data transmission apparatuses are identical in construction to the data transmission apparatus 100. That is, a first data transmission apparatus 100a has a transmission unit 110a, a reception unit 120a, and a transmission path 130a. The transmission unit 110a includes a data mapping unit 111a, a first initialization pattern generator 112a, a second initialization pattern generator 113a, a selector 114a, a digital filter 115a, a D/A converter 116a, a low-pass filter 117a, and a driver 118a. The reception unit 120a has a receiver 121a, a low-pass filter 122a, an A/D converter 123a, a digital filter 124a, an evaluation unit 125a, a clock reproduction unit 126a, an evaluation level holding unit 127a, a synchronization/initialization pattern detector 128a, and a transmission data controller 129a.

Likewise, a second data transmission apparatus 100b has a transmission unit 110b, a reception unit 120b, and a transmission path 130b. The transmission unit 110b includes a data mapping unit 111b, a first initialization pattern generator 112b, a second initialization pattern generator 113b, a selector 114b, a digital filter 115b, a D/A converter 116b, a low-pass filter 117b, and a driver 118b. The reception unit 120b has a receiver 121b, a low-pass filter 122b, an A/D converter 123b, a digital filter 124b, an evaluation unit 125b, a clock reproduction unit 126b, an evaluation level holding unit 127b, a synchronization/initialization pattern detector 128b, and a transmission data controller 129b.

Further, a final-stage data transmission apparatus 100n has a transmission unit 110n, a reception unit 120n, and a transmission path 130n. The transmission unit 110n includes a data mapping unit 111n, a first initialization pattern generator 112n, a second initialization pattern generator 113n, a selector 114n, a digital filter 115n, a D/A converter 116n, a low-pass filter 117n, and a driver 118n. The reception unit 120n has a receiver 121n, a low-pass filter 122n, an A/D converter 123n, a digital filter 124n, and evaluation unit 125n, a clock reproduction unit 126n, an evaluation level holding unit 127n, a synchronization/initialization pattern detector 128n, and a transmission data controller 129n.

The transmission unit 110a of the first data transmission apparatus 10a and the reception unit 120b of the second data transmission apparatus 100b are connected with the transmission path 130a, the transmission unit 110b of the second data transmission apparatus 100b and the reception unit 120c of the third data transmission apparatus 100c are connected with the transmission path 130b, and the transmission unit 110n of the final-stage data transmission apparatus 100n and the reception unit 120a of the first data transmission apparatus 100a are connected with the transmission path 130n, thereby constituting the ring-shaped network.

The first data transmission apparatus 100a is a master which outputs data at turn-on of power or immediately after reset, and the second to n-th data transmission apparatuses 100b to 100n are slaves which are operated according to the data outputted from the master.

The transmission data controller 129a of the first data transmission apparatus is supplied with a signal indicating that this apparatus 100a is a master, and each of the transmission data controllers 129b to 129n of the second to n-th data transmission apparatuses 100b to 100n is supplied with a signal indicating that this apparatus is a slave.

Based on the signal indicating that the apparatus is a master, the transmission data controller 129a outputs a transmission data control signal instructing transmission of the second initialization pattern signal when synchronization of the reception unit 120a is established. Further, on receipt of the beginning of the signal for recognizing the start of the second initialization pattern signal, the transmission data controller 129a outputs a transmission data control signal instructing transmission of the signal that is mapped in the data mapping unit 111a.

On the other hand, based on the signal indicating that the apparatus is a slave, each of the transmission data controllers 129b to 129n outputs a transmission data control signal indicating transmission of the first initialization pattern signal when synchronization of each of the reception units 120b to 120n is established. Further, on receipt of the beginning of the signal for recognizing the start of the second initialization pattern signal, the transmission data control unit outputs a transmission data control signal instructing transmission of the second initialization pattern signal.

Next, the operation of the data transmission apparatus 100 will be described.

As shown in FIG. 3, the data mapping unit 111 maps eight kinds of 3-bit data symbols to eight signal levels. FIG. 3 is a conversion table illustrating conversion from data symbols to signal levels (mapping values), in which 3-bit data symbols are mapped to any of eight signal levels, "−7", "−5", "−3", "−1", "+1", "+3", "+5", and "+7".

Hereinafter, the data transmission apparatus 100 performing such 8-value transmission will be described.

Next, the operation of the data transmission apparatus 100 so constructed will be described.

Initially, ordinary data transmission will be described. In ordinary data transmission, every three bits of digital data being transmitted in the transmission unit 110 are mapped to one of eight signal levels according to the conversion table shown in FIG. 3, at every symbol timing. Since the selector 114 is supplied with the transmission data control signal instructing transmission of the signal from the data mapping unit 111, the selector 114 selects the signal that is mapped in the data mapping unit 111, and inputs this signal to the digital filter 115. The digital filter 115 is a low-pass filter that allows a band of frequency components corresponding to half of the symbol rate to pass, and actually it is constituted so as to have appropriate roll-off characteristics in combination with the digital filter 124 of the reception unit 120. The signal that has been passed through the digital filter 115 is converted into an analog signal by the D/A converter 116, and the analog signal is passed through the low-pass filter 117, whereby a signal within A hand that is slightly larger than half of the symbol rate is obtained, and a signal having no interference between adjacent codes is obtained at readout timing. Thereby, data transmission in the finite band can be carried out. Then, the driver 118 amplifies the signal intensity of this signal, and outputs the signal to the transmission path 130.

Figure 4:
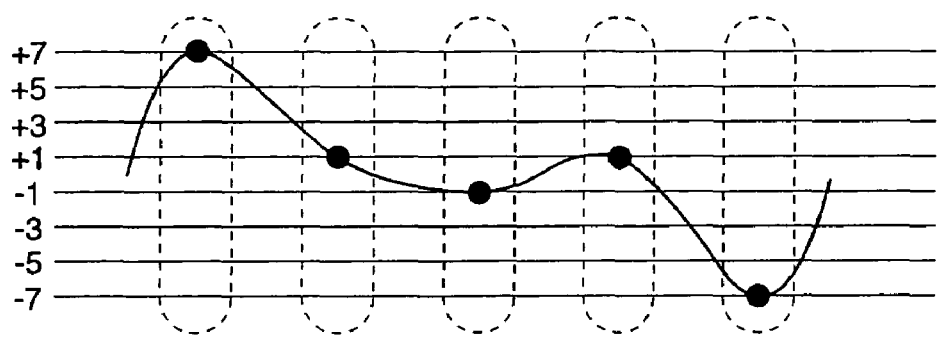
FIG. 4 is a diagram illustrating an example of a waveform on a transmission path according to the first embodiment of the invention.

An example of a waveform on the transmission path is shown in FIG. 4. In the example of FIG. 4, the signal levels are transmitted in order of "+7", "+1", "−1", "+1", "−7", ..., and data symbols "111(+7)", "100(+1)", "011(−1)", "100(+1)", "000(−7)", ... are transmitted.

The signal so transmitted is received by the reception unit 120.

In the reception unit 120, the receiver 121 receives the signal, and the low-pass filter 122 removes noises outside the signal band. Then, the A/D converter 123 converts the signal into digital data, and the digital data is passed through the digital filter 124. The digital filter 124 has roll-off characteristics in combination with the digital filter 115 of the transmission unit 110, and it converts the digital data into a signal that can be received without being affected by interference between adjacent codes, at appropriate timing. Thereafter, the evaluation unit 125 decodes the data symbols on the basis of the signal level evaluation values which are stored in the evaluation level holding unit 127. The clock reproduction unit 126 reproduces a clock from the received data, and establishes synchronization when decoding the data symbols. Ordinary data transmission is carried out as described above.

Next, the initialization method by the data transmission apparatus 100 that operates as above will be described.

Figure 5:
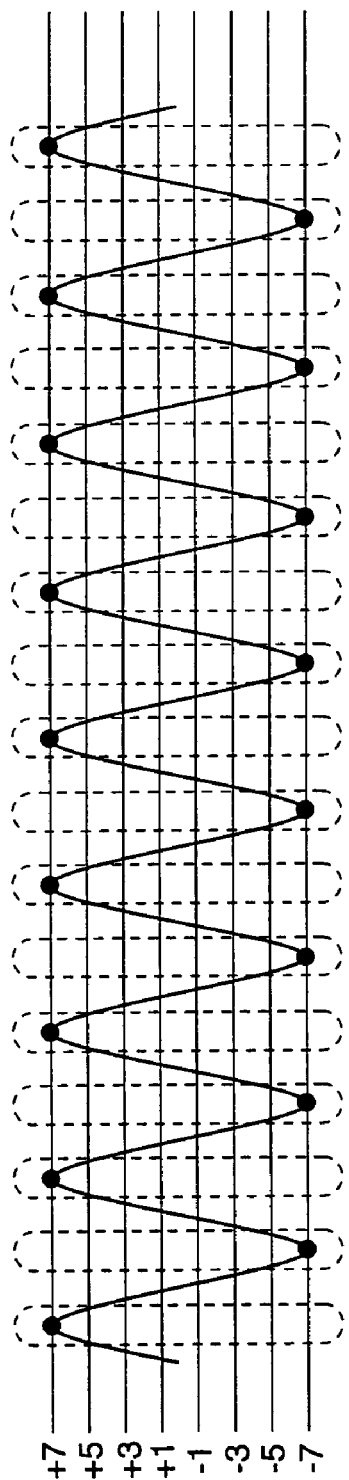
FIG. 5 is a diagram illustrating a first initialization pattern signal according to the first embodiment of the invention.
Figure 6:
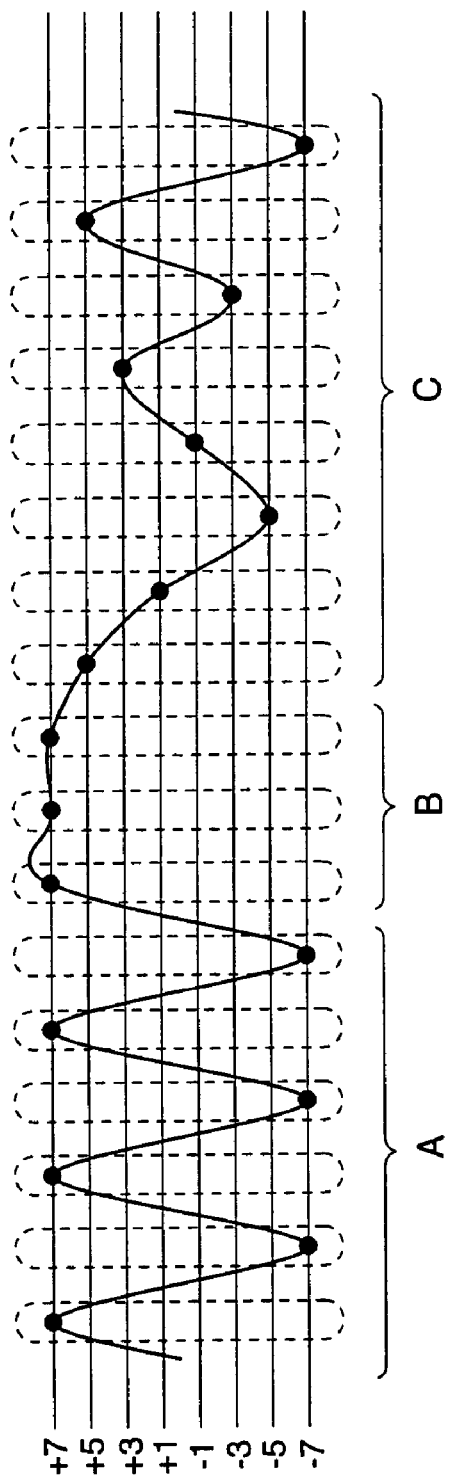
FIG. 6 is a diagram illustrating an example of a signal to be used in initialization according to the first embodiment of the invention.

FIG. 5 is a diagram illustrating the first initialization pattern signal. FIG. 6 is a diagram illustrating an example of a signal to be used for initialization.

A signal to be used for initialization includes signal components as follows: a first initialization pattern signal including a frequency component equal to ½ of the symbol rate, in which a maximum amplitude level and a minimum amplitude level appear alternately (portion A shown in FIGS. 5 and 6); a signal for recognizing the start of a second initialization pattern signal, which has a maximum amplitude level (portion B shown in FIG. 6); and a second initialization pattern signal in which all signal levels appear in an arrangement that is predetermined by the transmission unit 110 and the reception unit 120 (portion C shown in FIG. 6).

The first initialization pattern signal is generated by the first initialization pattern generator 112. On the other hand, the signal for recognizing the start of the second initialization pattern signal, and the second initialization pattern signal are generated by the second initialization pattern generator 113. FIG. 6 shows an example in which a portion of a predetermined arrangement of signal levels in the second initialization pattern signal is "+5", "+1", "−5", "−1", "+3", "−3", "+5", "−7". This evaluation level setting pattern signal is desired to be a signal such as a PN pattern, in which all of the signal levels are evenly included, and various patterns appear.

Further, the transmission data controller 129 outputs, to the selector 114, a transmission data control signal indicating transmission of any of the signal from the data mapping unit 111, the first initialization pattern signal, and the second initialization pattern signal, on the basis of the output from the synchronization/initialization pattern detector 128. Then, the selector selects a signal to be transmitted, on the basis of the transmission data control signal.

Next, the operation of the ring-shaped network so constituted will be described with reference to FIG. 7.

Figure 7:
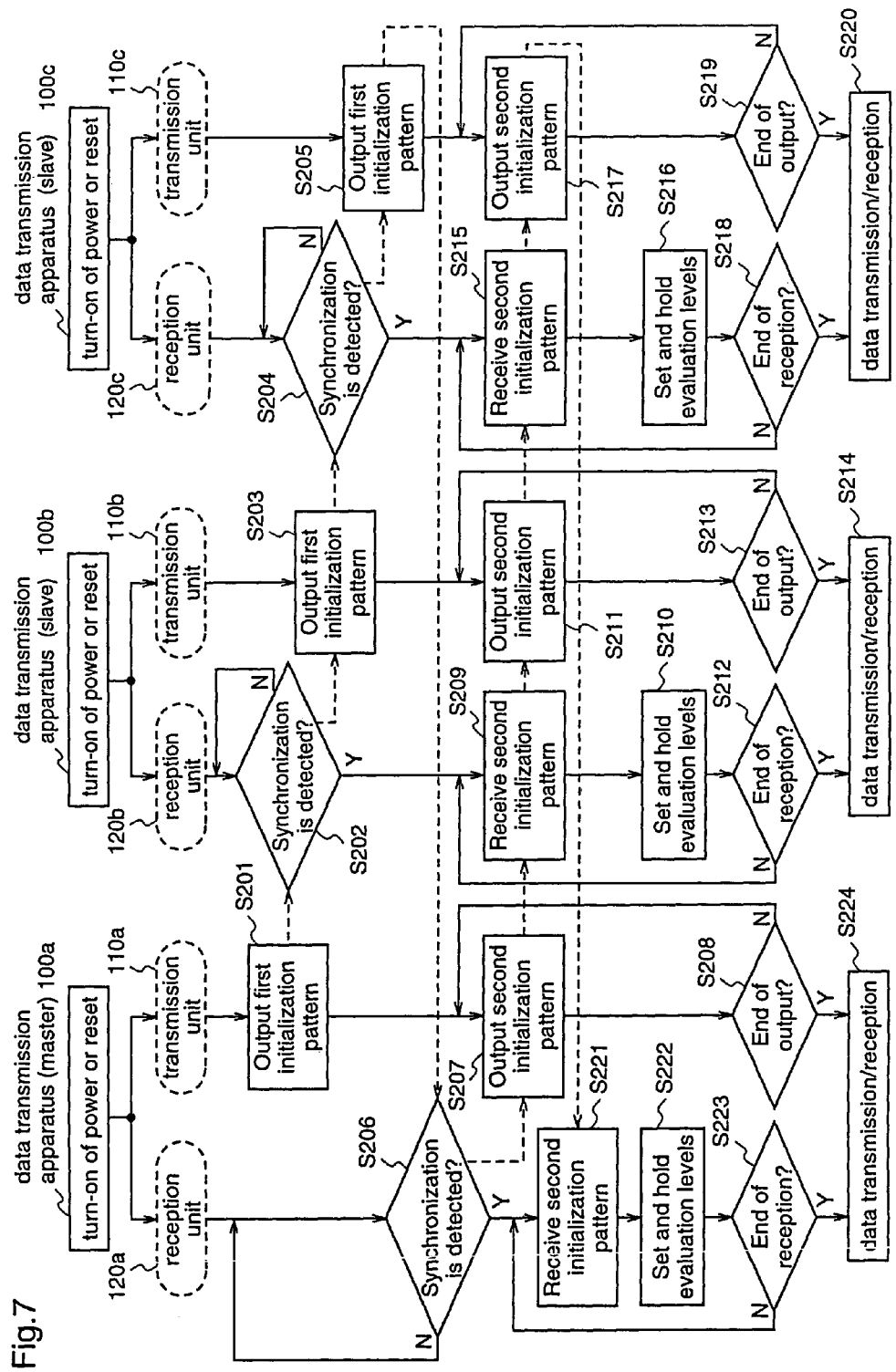
FIG. 7 is a flowchart for explaining the operation of the ring-shaped network according to the first embodiment of the invention.
Figure 8:
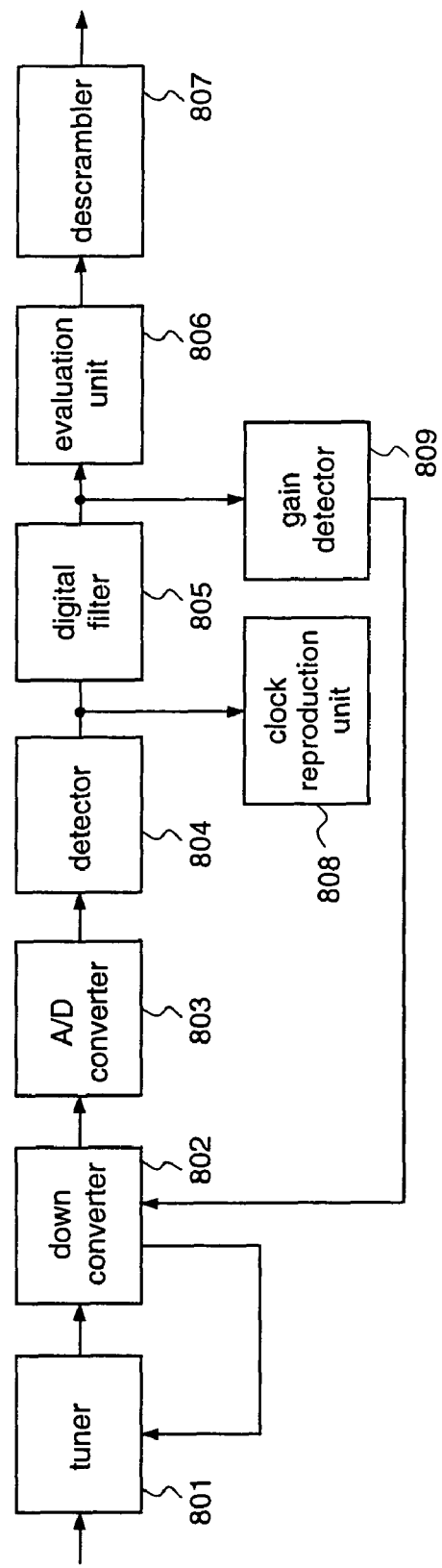
FIG. 8 is a block diagram illustrating the construction of a CAVT receiver as a conventional data transmission apparatus.

FIG. 7 is a flowchart for explaining the operation of the ring-shaped network. Here, a ring-shaped network comprising three stages of data transmission apparatuses 100a to 100c will be described.

At turn-on of power or immediately after reset, the transmission unit 110a of the first data transmission apparatus 10a transmits the first initialization pattern signal. That is, the selector 114a selects the first initialization pattern signal generated by the first initialization pattern generator 112a, and inputs this signal to the digital filter 115a. Then, the first initialization pattern signal is output to the transmission path 130a in like manner as the ordinary data transmission (step S201).

The first initialization pattern signal so transmitted is received by the reception unit 120b of the second data transmission apparatus 100b. When the reception unit 120b receives the first initialization pattern signal, initially, the clock reproduction unit 126b performs clock reproduction. When the synchronization/initialization pattern detector 128b detects that synchronization is established, a synchronization detection signal is output to the transmission data controller 129b. Then, the transmission data control unit 129b outputs a transmission data control signal instructing transmission of the first initialization pattern signal, to the selector 114b of the transmission unit 110b (step S202).

When the transmission data control signal instructing transmission of the first initialization pattern signal is input to the selector 114b, the transmission unit 110b transmits the first initialization pattern signal. That is, the selector 114b selects the first initialization pattern signal generated by the first initialization pattern generator 112b, and inputs this signal to the digital filter 115b. Then, the first initialization pattern signal is output to the transmission path 130b in like manner as the ordinary data transmission (step S203).

The first initialization pattern signal so transmitted is received by the reception unit 120c of the third data transmission apparatus 100c. When the reception unit 120c receives the first initialization pattern signal, initially, the clock reproduction unit 126c performs clock reproduction, and the synchronization/initialization pattern detector 128c detects that synchronization is established. After establishment of synchronization, the transmission data control unit 129c outputs a transmission data control signal instructing transmission of the first initialization pattern signal, to the selector 114c of the transmission unit 110c (step S204).

When the transmission data control signal instructing transmission of the first initialization pattern signal is input to the selector 114c, the transmission unit 110c transmits the first initialization pattern signal. That is, the selector 114c selects the first initialization pattern signal generated by the first initialization pattern generator 112c, and inputs this signal to the digital filter 115c. Then, the first initialization pattern signal is output to the transmission path 130c in like manner as the ordinary data transmission (step S205).

The first initialization pattern signal so transmitted is received by the reception unit 120a of the first data transmission apparatus 100a. When the reception unit 120a receives the first initialization pattern signal, initially, the clock reproduction unit 126a reproduces a clock, and then the synchronization/initialization pattern detector 128a detects that synchronization is established. Thereafter, the transmission data control unit 129a outputs a transmission data control signal instructing transmission of the second initialization pattern signal, to the selector 114a of the transmission unit 110a (step S206).

When the transmission data control signal instructing transmission of the second initialization pattern signal is input to the selector 114a of the first data transmission apparatus 10a, the selector 114a selects, as a transmission signal, the second initialization pattern signal generated by the second initialization pattern generator 113a, and inputs this signal to the digital filter 115a. Then, the second initialization pattern signal and the signal for recognizing the start of the second initialization pattern signal are output to the transmission path 130a in like manner as for the first initialization pattern signal (step S207).

Thereafter, output of data is continued until all of the signal levels of the second initialization pattern signal are output to the transmission path 130a (step S208).

The second initialization pattern signal so transmitted is received by the reception unit 120b of the second data transmission apparatus 100b. When the synchronization/initialization pattern detector 128b detects the beginning of the signal for recognizing the start of the second initialization pattern signal, the transmission data controller 129b outputs a transmission data control signal instructing transmission of the second initialization pattern signal, to the selector 114b of the transmission unit 110b (step S209).

When the reception unit 120b receives the signal for recognizing the start of the second initialization pattern signal and, further, the second initialization pattern signal, the evaluation level holding unit 127b performs threshold evaluation for the signal levels to set evaluation levels to be used when decoding the signal levels to the data symbols. The evaluation level holding unit 127b detects the voltage values of the respective signal levels included in the second initialization pattern signal. That is, the voltage values of the respective signal levels "+7", "+5", "+3", "+1", "−7", "−5", "−3", and "−1" are obtained. Then, the evaluation level holding unit 127b sets the evaluation levels for the respective signal levels on the basis of the obtained voltage values of the signal levels, and holds these evaluation levels (step S210).

When the transmission data control signal instructing transmission of the second initialization pattern signal is input to the selector 114b, the transmission unit 110b transmits the second initialization pattern signal. That is, the selector 114b selects the second initialization pattern signal generated by the second initialization pattern generator 113b, and inputs this signal to the digital filter 115b. Then, the signal for recognizing the start of the second initialization pattern signal and the second initialization pattern signal are output to the transmission path 130b in like manner as for the first initialization pattern signal (step S211).

When the reception unit 120b has received all of the signal levels of the second initialization pattern signal, and setting of the evaluation levels has been completed, the transmission data controller 129b outputs a transmission data control signal instructing transmission of the signal which is mapped in the data mapping unit 111b, to the selector 114b of the transmission unit 110b (step S212).

The transmission unit 10b continues to output data until all of the signal levels of the second initialization pattern signal are output to the transmission path 130b (step S213).

When reception of the second initialization pattern signal and setting of the evaluation levels (step S212) and transmission of the second initialization pattern signal (step S213) have been completed, the second data transmission apparatus 100b is in the state where it can perform transmission/reception of data (step S214).

The second initialization pattern signal transmitted from the second data transmission apparatus 100b is received by the reception unit 120c of the third data transmission apparatus 100c. When the synchronization/initialization pattern detector 128c detects the beginning of the signal for recognizing the start of the second initialization pattern signal, the transmission data controller 129c outputs a transmission data control signal instructing transmission of the second initialization pattern signal, to the selector 114c of the transmission unit 110c (step S215)

When the reception unit 120c receives the signal for recognizing the start of the second initialization pattern signal and, further, the second initialization pattern signal, the evaluation level holding unit 127c sets the evaluation levels, and holds them (step S216).

When the transmission data control signal instructing transmission of the second initialization pattern signal is input to the selector 114c, the transmission unit 110c transmits the second initialization pattern signal. That is, the selector 114c selects the second initialization pattern signal generated by the second initialization pattern signal, and inputs this signal to the digital filter 115c. Then, the transmission unit 110c outputs the signal for recognizing the start of the second initialization pattern signal, and the second initialization pattern signal to the transmission path 130c in like manner as for the first initialization pattern signal (step S217).

When the reception unit 120c receives all of the signal levels of the second initialization pattern signal, and setting of the evaluation levels is completed, the transmission data controller 129c outputs a transmission data control signal instructing transmission of the signal mapped in the data mapping unit 111c, to the selector 114c of the transmission unit 110c (step S218).

Further, the transmission unit 110c continues to output data until all of the signal levels of the second initialization pattern signal are output to the transmission path 130c (step S219).

When reception of the second initialization pattern signal and setting of the evaluation levels (step S218) and transmission of the second initialization pattern signal (step S219) have been completed, the third data transmission apparatus 100c is in the state where it can perform transmission/reception of data (step S220).

The second initialization pattern signal transmitted from the third data transmission apparatus 100c is received by the reception unit 120a of the first data transmission apparatus 10a (step S221).

When the reception unit 120a receives the signal for recognizing the start of the second initialization pattern signal and, further, the second initialization pattern signal, the evaluation level holding unit 127a sets the evaluation levels, and holds them (step S222).

When all of the signal levels of the second initialization pattern signal have been received, and setting of the evaluation levels has been completed, the transmission data controller 129a outputs a transmission data control signal instructing transmission of the signal that is mapped in the data mapping unit 111a to the selector 114a of the transmission unit 110a (step S223).

When transmission of the second initialization pattern signal (step S208) and reception of the second initialization pattern signal and setting of the evaluation levels (step S223) have been completed, the first data transmission apparatus 110a is in the state where it can perform transmission/reception of data (step S224).

In this way, clock synchronization is established in all of the data transmission apparatuses 100a to 100c connected in the ring-shaped network, and the evaluation levels are set and stored. Thereafter, transmission data control signals instructing transmission of the signals mapped in the data mapping units 111a to 111c are input to the selectors 114a to 114c of the transmission units 111a to 110c, whereby the selectors 114a to 114c select the signals from the data mapping units 111a to 111c as transmission signals. That is, transmission/reception of data is started, and the evaluation units 125a to 125c evaluate the received data and decode the data symbols with reference to the evaluation levels stored in the evaluation level holding units 127a to 127c.

As described above, the data transmission apparatus 100 according to the first embodiment is a data transmission apparatus connected in a ring-shaped network, and the apparatus 100 is provided with the first initialization pattern output unit 112 for outputting the first initialization pattern signal to the next-stage data transmission apparatus, the second initialization pattern generation unit 113 for outputting the second initialization pattern signal to the next-stage data transmission apparatus, and the synchronization establishment unit 126 for receiving the first initialization pattern signal outputted from the previous-stage data transmission apparatus, and performing clock reproduction to establish synchronization. Since the data transmission apparatus 100 starts transmission/reception of data after synchronization is established by the first initialization pattern signal and evaluation levels are set by the second initialization pattern signal, evaluation levels can be set after synchronization of the data transmission apparatus 100 is established. Further, since evaluation levels are set according to the voltage values of the respective signal levels included in the second initialization pattern signal, evaluation levels can be set in accordance with the transmission path, whereby accurate data reception can be carried out without being affected by the pattern of data symbols to be transmitted or the values of the received signal levels.

Furthermore, one of the data transmission apparatuses 100 connected in the ring-shaped network is used as a master which outputs the first initialization pattern signal at turn-on of power or immediately after reset, and outputs the second initialization pattern signal by the second initialization pattern generator when synchronization is established in all of the data transmission apparatuses, while the other data transmission apparatuses 100 are used as slaves which output the first initialization pattern signal from the first initialization pattern generator when synchronization is established, and output the second initialization pattern signal from the second initialization pattern generator on receipt of the beginning of the second initialization pattern signal, whereby the ring-shaped network can be initialized. Furthermore, since the slave can transmit the second initialization pattern signal to the next-stage data transmission apparatus upon receipt of the beginning of the second initialization pattern signal, setting of the evaluation levels and initialization of the ring-shaped network can be carried out more speedily.

Further, the first initialization pattern signal outputted from the first data transmission apparatus 100a as a master is received by the second data transmission apparatus 100b as a slave to establish synchronization. When synchronization is established, the second data transmission apparatus 100b outputs the first initialization pattern signal to the n-th data transmission apparatus 100n in the next stage. When synchronization is established in all of the data transmission apparatuses, the first data transmission apparatus 100a outputs the second initialization pattern signal to the second data transmission apparatus 100b, and the second data transmission apparatus 100b receives the second initialization pattern signal to set evaluation levels, and outputs the second initialization pattern signal to the n-th data transmission apparatus 100n in the next stage. When setting of evaluation levels is completed in all of the data transmission apparatuses, transmission/reception of data is started. Therefore, synchronization in each data transmission apparatus can be established, and evaluation levels can be set. Further, since evaluation levels are set according to the voltage values of the respective signal levels included in the second initialization pattern signal, evaluation levels can be set in accordance with the transmission path, whereby accurate data reception can be carried out without being affected by the pattern of data symbols to be transmitted, and the values of the received signal levels.

Further, since the first initialization pattern signal is a signal in which a maximum amplitude level and a minimum amplitude level appear alternately, clock synchronization can be established utilizing the amplitude of the first initialization pattern signal received.

Furthermore, since the second initialization pattern signal is a signal in which all of the signal levels appear in an arrangement that is predetermined by the transmission unit 110 and the reception unit 120, all of the signal levels can be obtained without scrambling the second initialization pattern signal.

In the above description as shown in FIG. 3, 3-bit data are mapped to any of eight signal levels "−7", "−5", "−3", "−1", "+1", "+3", "+5", and "+7" according to their combinations by the data mapping unit 111 of the data transmission apparatus 100. However, the present invention is not restricted to the above-described 8-value transmission, and arbitrary multi-valued transmission may be carried out.

Furthermore, differential mapping in which mapping of data to be transmitted is carried out according to the signal level that is mapped last time, may be employed. In this case, evaluation of the signal level is carried out on the basis of the difference between the signal level that is just received by the reception unit 120 and the signal level that is received last time, and the decoding is carried out. Also in this case, the same effects as described above can be achieved by holding the evaluation levels based on the differences in the signal levels with the evaluation level holding unit.

APPLICABILITY IN INDUSTRY

The data transmission apparatus according to the present invention transmits an initialization pattern signal at turn-on of power or immediately after reset, and performs establishment of synchronization and setting of evaluation levels on receipt of the initialization pattern signal. Therefore, evaluation levels can be set in accordance with the transmission path, and establishment of synchronization and setting of evaluation levels can be carried out also in a ring-shaped network constituted by plural data transmission apparatuses.

The invention claimed is:

1. An initialization method for use in a ring-shaped network comprising a plurality of stages of data transmission apparatuses, each performing data transmission while assigning one or more bits of data as one data symbol to a signal level, one data transmission apparatus being a master data transmission apparatus, any remaining data transmission apparatuses being slave data transmission apparatuses, said initialization method comprising:

outputting a first initialization pattern signal from the master data transmission apparatus to a slave data transmission apparatus in a next stage upon turn-on of power or immediately after reset;

establishing clock synchronization via the next-stage slave data transmission apparatus upon receipt of the first initialization pattern signal;

outputting the first initialization pattern signal from the next-state slave data transmission to a slave data transmission apparatus in the following stage when clock synchronization is established;

outputting a second initialization pattern signal from the master data transmission apparatus to the next-stage slave data transmission apparatus after outputting the first initialization pattern signal;

setting an evaluation level for each signal level via the next-stage slave data transmission apparatus when the next-stage slave data transmission apparatus receives the second initialization pattern signal;

outputting the second initialization pattern signal from the next-stage slave data transmission apparatus to the slave data transmission apparatus in the following stage; and starting transmission/reception of data in the data transmission apparatuses connected in the ring-shaped network after establishing the evaluation levels.

2. An initialization method as defined in claim 1, wherein said outputting a second initialization pattern signal from the master data transmission apparatus comprises outputting a signal in which a PN pattern is assigned to data symbols.

3. An initialization method as defined in claim 2, wherein said outputting a first initialization pattern signal from the master data transmission apparatus comprises outputting a signal in which a signal for discriminating between the first initialization pattern signal and the second initialization pattern signal appears at the end.

4. An initialization method as defined in claim 2, wherein said outputting a second initialization pattern signal from the master data transmission apparatus comprises outputting a signal in which a signal for discriminating between the first initialization pattern signal and the second initialization pattern signal appears at the beginning.

5. A data transmission apparatus which is connected in a ring-shaped network, and is operable to perform data transmission while assigning one or more bits of data as one data symbol to a signal level, said data transmission apparatus comprising:

a first initialization pattern output unit operable to output a first initialization pattern signal for establishing clock synchronization to a data transmission apparatus connected in a next stage of the ring-shaped network;

a second initialization pattern output unit operable to output a second initialization pattern signal for setting an evaluation level by which the signal level is subjected to threshold evaluation, to the data transmission apparatus connected in the next stage of the ring-shaped network; and a synchronization establishment unit operable to receive the first initialization pattern signal transmitted from a data transmission apparatus connected in a previous stage of the ring-shaped network, and to perform clock reproduction to establish synchronization, wherein said data transmission apparatus is operable to start transmitting/receiving data after synchronization is established on receipt of the first initialization pattern signal, and wherein said data transmission apparatus is operable to set evaluation levels of data upon receipt of the second initialization pattern signal.

6. A data transmission apparatus as defined in claim 5, wherein said data transmission apparatus is a master data transmission apparatus in which said first initialization pattern output unit is operable to output the first initialization pattern signal at turn-on of power or immediately after reset, and wherein said second initialization pattern output unit is operable to output the second initialization pattern signal when synchronization is established.

7. A data transmission apparatus as defined in claim 5, wherein said data transmission apparatus is a slave data transmission apparatus in which said first initialization pattern output unit is operable to output the first initialization pattern signal when synchronization is established, and wherein said second initialization pattern output unit is operable to output the second initialization pattern signal when the beginning of the second initialization pattern signal is received.

* * * * *

UNITED STATES PATENT AND TRADEMARK OFFICE
CERTIFICATE OF CORRECTION

| | | |
|---|---|---|
| PATENT NO. | : 7,012,936 B2 | Page 1 of 1 |
| APPLICATION NO. | : 10/398452 | |
| DATED | : March 14, 2006 | |
| INVENTOR(S) | : Hirotsugu Kawada et al. | |

It is certified that error appears in the above-identified patent and that said Letters Patent is hereby corrected as shown below:

On the Title page, Title (54), please change "INITIALIZING METHOD AND DATA TRANSMITTER" to --INITIALIZATION METHOD, AND DATA TRANSMISSION APPARATUS--.

Signed and Sealed this

Thirty-first Day of October, 2006

JON W. DUDAS
*Director of the United States Patent and Trademark Office*